United States Patent [19]

Tisdale

[11] 3,748,644

[45] July 24, 1973

[54] AUTOMATIC REGISTRATION OF POINTS IN TWO SEPARATE IMAGES

[75] Inventor: Glenn E. Tisdale, Towson, Md.

[73] Assignee: Westinghouse Electric Corporation, Pittsburgh, Pa.

[22] Filed: Dec. 31, 1969

[21] Appl. No.: 889,510

[52] U.S. Cl......... 340/149 A, 178/6.8, 340/146.3 Q, 340/146.3 H, 343/5 MM

[51] Int. Cl......... H04n 7/12, H04n 3/00, G06f 7/00

[58] Field of Search...................... 340/149 R, 146.3, 340/146.3 Q, 146.3 H; 178/6.8; 235/150.2, 150.23, 150.25, 150.27; 343/5 MM

[56] References Cited

UNITED STATES PATENTS

| | | | |
|---|---|---|---|
| 2,952,075 | 9/1960 | Davis | 340/149 R X |
| 3,678,190 | 7/1972 | Cook | 343/5 MM X |
| 3,636,323 | 1/1972 | Salisbury | 235/150.2 X |
| 3,444,380 | 5/1969 | Webb | 178/6.8 |
| 3,504,112 | 3/1970 | Gruenberg | 178/6.8 X |
| 3,555,179 | 1/1971 | Rubin | 178/6.8 |
| 3,586,770 | 6/1971 | Bonebreak | 178/6.8 |

*Primary Examiner*—Donald J. Yusko
*Attorney*—F. H. Henson and E. P. Klipfel

[57] ABSTRACT

Features are extracted from a two-dimensional image for subsequent comparison with features extracted from a further two-dimensional image to determine whether the separate images have at least one area in common, and if so, to provide automatic registration of points of correspondence in the two images in the area or areas in common.

19 Claims, 3 Drawing Figures

INVENTOR
GLENN E. TISDALE

BY
Ernest P. Klipfel
ATTORNEY

INVENTOR
GLENN E. TISDALE

BY

Ernest P. Klipfel
ATTORNEY

AUTOMATIC REGISTRATION OF POINTS IN TWO SEPARATE IMAGES

BACKGROUND OF THE INVENTION

1. Field of the Invention

The present invention resides in the field of pattern comparison and is particularly directed to a system and to a method for automatic registration of corresponding points in two images of different position, orientation, and/or scale.

2. Description of the Prior Art:

The technical terms used throughout this disclosure are intended to convey their respective art-recognized meanings, to the extent that each such term constitutes a term of art. For the sake of clarity, however, each technical term will be defined as it arises. In those instances where a term is not specifically defined, it is intended that the common and ordinary meaning of that term be ascribed to it.

By "image," as used above and as will hereinafter be used throughout this specification and the appended claims, is meant a field of view; that is, phenomena observed or detected by one or more sensors of a suitable type. For example, an image may be a two-dimensional representation or display as derived from photosensitive devices responsive to radiant energy in the visible spectrum (e.g., optical scanners responsive to reflected light, or photographic devices such as cameras) or responsive to radiant energy in the infrared (IR) region, or a display as presented on a cathode ray tube (CRT) screen responsive to electrical signals (e.g., a radar image), and so forth. An image may or may not contain one or more "patterns." A pattern is simply a recognizable characteristic that may or may not be present within an image, and, for example, may correspond to one or more figures, objects, or characters within the image.

There is at present a growing need to provide automatic correlation of images which have been obtained or derived from remote sensing systems such as those of the type mentioned above, i.e., electro-optical, infrared, and radar images, to name a few. A wealth of information is available from the outputs of these sensing systems and in an effort to obtain as much significant data as possible from the mass of information presented, it is frequently necessary that areas in common in two or more fields of view be recognized and that the correlation between the common areas be detected. At times it may be desirable to assemble large images from a plurality of smaller overlapping sections obtained at different times or from different sensing units. At other times it may be desired to compare two images of the same scene or what is believed to be the same scene, which have been derived at different times or which have been derived from sensors or sensing systems of different spectral characteristics, i.e., to correlate multispectral images.

Figure 1:
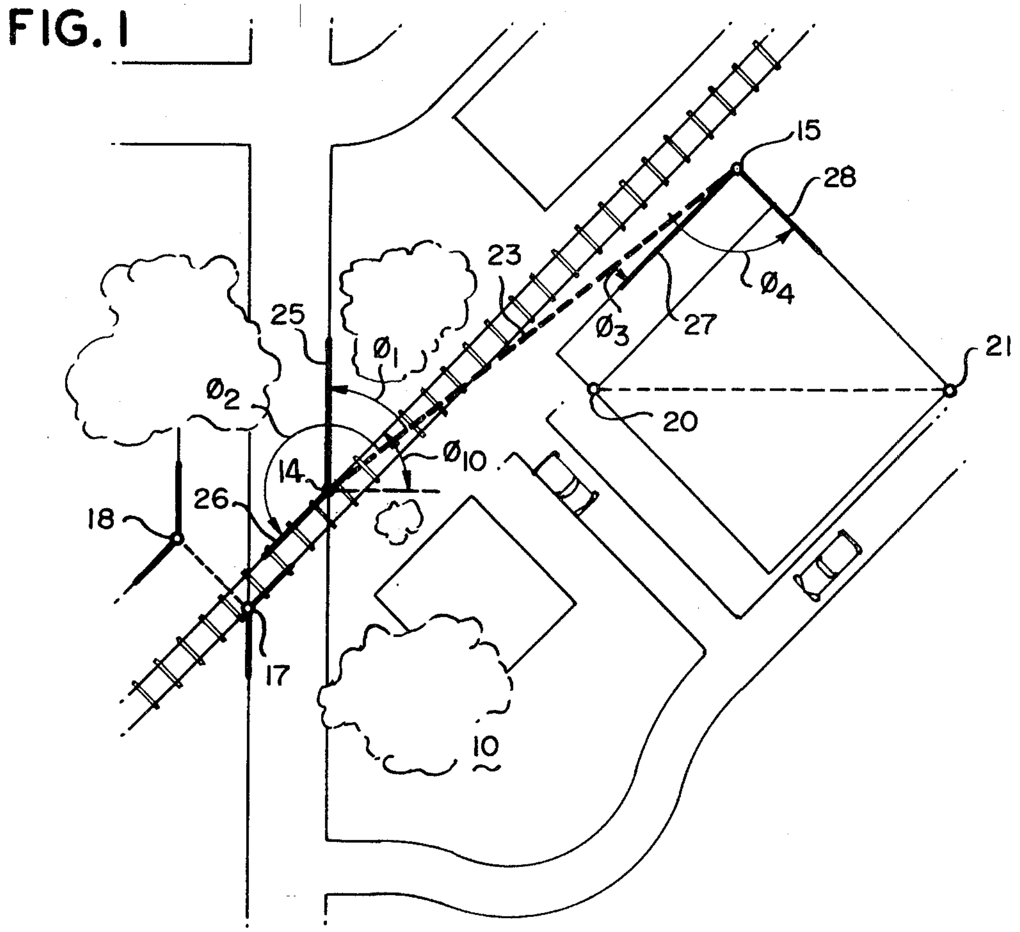

It may happen that two or more images, such as photographic transparencies, relate to the same scene but differ in the relative position of the subject matter of interest within each image, as well as differ in relative scale or orientation. Increasing interest in surveys and reconnaissance of various areas of the earth and exploration and reconnaissance of other celestial bodies, makes it increasingly desirable to have available a method for recognizing the existence of a common area in two or more images, and for establishing for each point in one image the coordinates of the corresponding point io each image point are chosen to be invariant with respect to the scale, orientation, and position of the image patterns of which those measurements are a part. For example, the measurements may consist of the direction of image edges or contours (i.e., image lines) relative to the direction of the line of interconnection between the image points. In FIG. 1, prominent observable characteristics about image point 14 include lines 25 and 26, which intersect at that point. It will be observed that in both FIGS. 1 and 2 certain points and lines are exaggerated in intensity relative to other points and/or lines in the images presented in those figures. This is done purely for the sake of exemplifying and clarifying the manner of carrying out the method of the invention, and with the realization that, in practice, points and lines in the image will be prominent or not as the consequent of their natural significance in the sensed data from which the image is obtained.

Line 25 is oriented at an angle of $\theta_1$ with respect to the imaginery line 23 joining points 14 and 15, and line 26 is oriented at an angle of $\theta_2$ with respect to line 23. These angles $\theta_1$, $\theta_2$ are independent of the scale and orientation of image 10, and of the position of the image pattern of which they are a part within image 10. Similarly, lines 27 and 28 emanating from point 15 are oriented at angles of $\theta_3$ and $\theta_4$, respectively, relative to line 23. These are also measurements which are invariant regardless of orientation, scale, and/or position of the image. Other invariant measurements might also be obtained, such as the orientation of lines associated with image points 17 and 18 and with image points 20 and 21, relative to the imaginary lines respectively connecting those pairs of points. The number of image points accepted for processing and the number of invariant measurements taken with respect to those points is a function of the criteria employed in selecting image points, as previously discussed.

The relationship between a pair of image points with respect to which invariant measurements have been taken is obtained by reference to the geometry of interconnection of those points, such as the distance $S$ between them and/or the orientation $\phi$ of a line connecting them relative to a preselected reference axis, or that relationship may be obtained by reference to the positions (i.e., coordinates) of the points in a predetermined coordinate system.

A feature of an image, then, consists of certain invariant measurements of characteristics of the image taken with respect to predefined points within the image, and further consists of measurements indicative of the geometric relationship between the predefined points with which the invariant measurements are associated. Mathematically, the association may be expressed in a functional form, as follows:

$$F_A = f(\gamma_{A1}, \gamma_{A2}, \phi_A, S_A, X_A, Y_{A1}, X_{A2}, Y_{A2})$$

where $F_A$ is a feature taken from an image $A$;

$f(\gamma)$ is used in its usual mathematical sense of a function of terms;

$\gamma_{A1}$, $\gamma_{A2}$ are invariant measurements taken with respect to a pair of image points 1 and 2, respectively, in image $A$;

$X_{A1}$, $Y_{A1}$, $X_{A2}$, $Y_{A2}$ are the coordinates of image points 1 and 2, respectively;

$\phi_A$ is the orientation of an imaginary line connecting points 1 and 2, relative to the image reference axis; and $S_A$ is the length of the imaginary line connecting image points 1 and 2.

Clearly, $\phi_A$ and $S_A$ are fully determined by values $X_{A1}$, $Y_{A1}$, $X_{A2}$, $Y_{A2}$, so they could be omitted from $F_A$, if desired, without loss of information.

Figure 2:
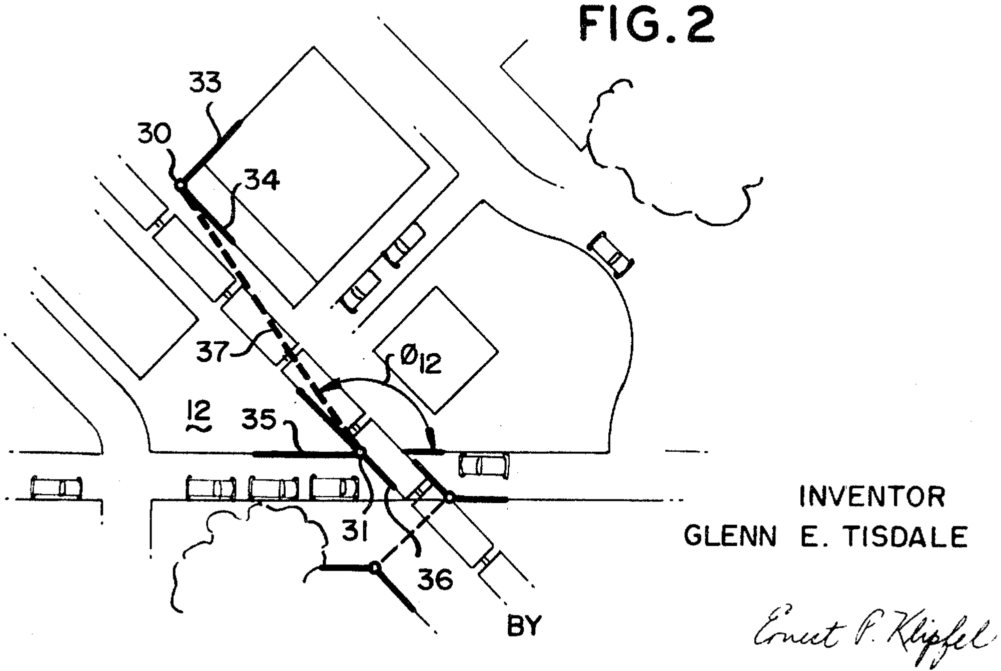

Measurements of the same general type are obtained from an image $B$, such as image 12 of FIG. 2, for the purpose of extracting features from that image which may be compared to features of another image (e.g., features of image $A$, here image 10 of FIG. 1). Referring to FIG. 2, among the image points deemed acceptable within the limits defined by the established criteria, there will appear points 30 and 31, and invariant measurements will be taken relative to those points, such as the orientation of lines 33 and 34 associated with point 30 and the orientation of lines 35 and 36 associated with point 31 relative to the imaginary line 37 joining points 30 and 31. In addition, the geometric relationship of points 30 and 31 will be obtained in the manner discussed above with reference to extraction of features from image 10 of FIG. 1. Many other image points will be examined and many other measurements taken, and while it that identical or substantially identical patterns are being compared, or that an area from which these features have been extracted is common to both images. Since each of the points in the cluster is derived from a pair of features, one from each image, the position coordinated for these features may be utilized to relate positions between the two images, and, by use of extrapolation techniques, additional corresponding points in the two images may be registered.

Figure 3:
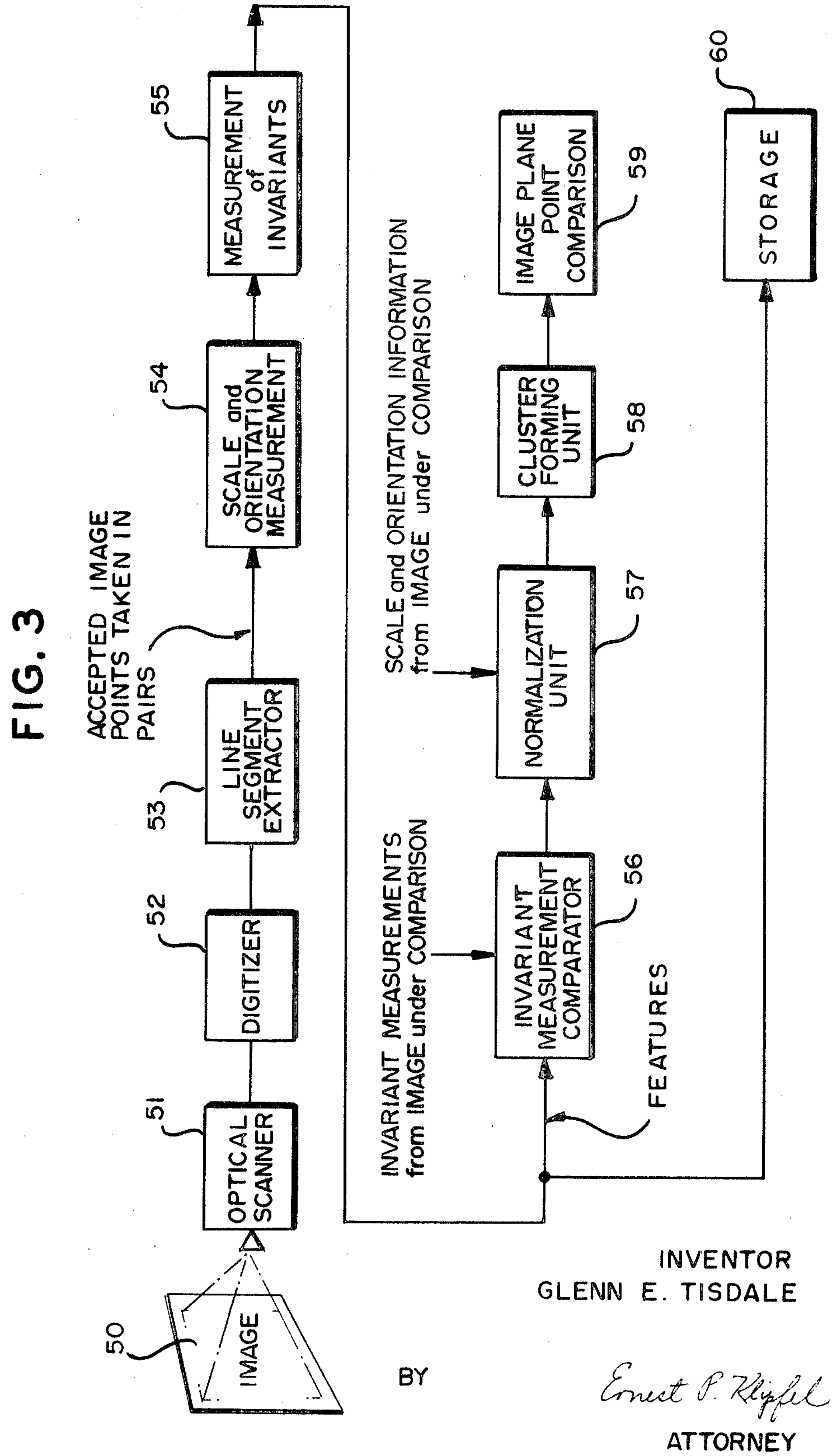

One embodiment of apparatus for performing the method of automatic correlation of two images and of registration of points in a common region of the two images is shown in block diagrammatic form in FIG. 3. An image 50 is scanned along horizontal lines at vertical increments by an optical scanner which generates analog sample outputs representative of intensity values or gray scales at prescribed intervals along these horizontal lines. These analog values are then digitized to a desired degree of resolution by digitizer 52. The digital signals generated by digitizer 52 are supplied to a line segment extractor 53, which extracts line segments or contours from the image by assembling groups of points having compatible directions of gray scale gradient, and by fitting a straight line segment to each group.

Image points are accepted for use in forming features on the basis that they possess a specific characteristic, such as location at the end of a line segment. Following the determination of such points by line segment extractor 53, the points are taken in pairs. Then scale and orientation measurement unit 54 determines the orientation and distance between the pairs of points, and the orientation of lines emanating from the points is determined relative to the orientation of the line between point pairs, in measurement of invariants unit 55. At this point, sets of features have been fully defined. It will be observed that the functions performed by individual units or components of the system of FIG. 3 constitute state-of-the-art techniques in the field of pattern recognition, and hence no claim of novelty is made as to those individual components per se. Rather, this aspect of the invention resides in the manner in which the conventional components are combined in an overall system adapted to perform the method.

The extracted features, each of which consists of certain invariant measurements and geometric relationships of image points with respect to which the invariant measurements have been taken, of the image under observation are now to be compared with the respective portions of features obtained from another image, for the purpose of determining the existence or non-existence of a region common to both images. To that end, the invariant characteristics derived by unit 55 are fed to an invariant measurement comparator 56 which receives as a second input the invariant measurements obtained from the second image. The second image may be processed simultaneously with the processing of image 50, but ordinarily previous processing of images will have been performed and the features extracted will be stored in appropriate storage units for subsequent comparison with features of the image presently under observation. In either case, correspondence between invariant measurements extracted from the two images may be sufficiently extensive, and in this respect it is to be emphasized that correspondence of measurements within only a limited region of each of the images may be enough, to provide an indication of identity of the images, at least in part. Should that situation be encountered, image registration and extrapolation to inter-relate all points in the common region of the two images may be performed directly following the invariant measurement comparison. More often, however, correspondence between invariant characteristics to, or exceeding, a predetermined extent is a prelude to further processing of image point pair geometric relationship information to normalize the scale and orientation of image patterns or areas which have been found to otherwise match one another.

Normalization is performed by unit 57 upon scale and orientation information received as inputs derived from image 50 and from the image with which image 50 is being compared. Comparison in cluster forming unit 58 of the normalized values for a substantial number of features, as generated by normalization unit 57, provides a cluster of points representative of the extent of feature matching in the $\phi$—$S$ plane. That is, the magnitude of the cluster is directly dependent upon the number of matches of feature pairs between the two images under consideration. The points in the cluster are used to relate common points in the two images, and by extrapolation, the inter-relationship of all points within the common area of the two images is resolved. Registration of points in the two images is performed by point comparison unit 59 in response to cluster information generated by cluster forming unit 58.

If desired, feature information derived by invariant measurement unit 55 and by scale and orientation measuring unit 54 may be stored in separate respective channels or banks of a storage unit 60 for subsequent comparison with features of other images during other image registration processing.

The preprocessing of image information to extract features therefrom of the same type as the features described herein is disclosed and claimed in the copending application of Glenn E. Tisdale, entitled "Preprocessing Method and Apparatus for Pattern Recognition," Ser. No. 867,250 filed Oct. 17, 1969, and now U. S. Letters Pat. No. 3,636,513 assigned to the assignee of the present invention.

I claim as my invention:

1. A process for correlating two unknown images to determine whether they contain a common region, said process including:

accepting at least two points of substantial information-bearing character within each image as image points for the extraction of features from the respective image, taking measurements, with respect to the accepted image points of each image and in relation to an imaginary line joining each such accepted image point and another accepted image point, of characteristics of the respective image which are invariant regardless of orientation and scale of the respective image, comparing the invariant measurements obtained from one of said images with the invariant measurements obtained from the other of said images, and if sufficient correspondence exists therebetween, correlating the image points of the two images with respect to which the corresponding invariant measurements have been obtained.

2. The process of claim 1 wherein said acceptable image points lie on lines within the respective image.

3. The process of claim 1 wherein at least some of said acceptable image points lie along gray scale intensity gradients of the respective image.

4. The process of claim 1 wherein said invariant characteristics include the orientation of lines in the respective image relative to the imaginary line joining each said two image points.

5. The process of claim 1 wherein said invariant characteristics include gray scale intensity gradients about accepted image points.

6. The process of claim 1 further comprising, deriving from each image the geometric relationship between at least some of the accepted image points for the respective image, and wherein said geometric relationship between image points includes the distance between a pair of said image points and the orientation of an imaginary line joining said pair of image points relative to a preselected reference axis.

7. The process of claim 6 wherein said correlating of image points includes normalizing the derived geometrical relationships between said images, comparing the normalized values for a plurality of said geometrical relationships, and inter-relating points within said images as points of correspondence in a region common to said images on the basis of the extent of correspondence between said normalized values.

8. The process of claim 7 wherein said comparing of normalized values includes developing a cluster of points in the image plane, in which the magnitude of said cluster is representative of the extent of correspondence of said normalized values.

9. The process of claim 1 wherein said images have been derived by respective sensors responsive to distinct and different portions of the frequency spectrum and have a substantial region in common.

10. The process of claim 1 wherein said images are representative of phenomena contained in fields of view of different spectral content.

11. The process of claim 1 wherein said images have a substantial region in common.

12. The process of claim 11 wherein said images are of different chronological origin.

13. The process of claim 1 wherein said images are overlapping in subject matter and have only a relatively small common region.

14. Apparatus for comparing selected characteristics of first and second images to determine a relationship therebetween, said apparatus comprising:

image means for providing first and second image electrical signals corresponding respectively to the first and second images;

extracting means responsive to the first and second image signals for determining at least first and second image points within each of the first and second images;

measuring means for measuring characteristics of the respective images, with respect to each said image point as defined by the corresponding image signal extracted therefrom, which characteristics are invariant regardless of orientation and scale of the respective images, and comparison means for comparing the invariant characteristics as measured for each of the first and second images, for determining correspondence therebetween within selected limits.

15. Apparatus as claimed in claim 14, wherein said extracting means is responsive to the first and second image signals for identifying and for determining the image points therein as extremeties or points of intersection of the identified lines.

16. Apparatus as claimed in claim 14, wherein there is further included:

second measuring means for measuring the distance between every pair of image points as determined by said extracting means, within each of the first and second images, third measuring means for measuring the angle between an imaginary line defined by each said pair of image points, within each of the first and second images, and preselected reference lines therein;

means for normalizing the distance and angle measurements derived from the first and second images; and means for comparing the normalized distance and angular measurements to further establish a relationship between the first and second images.

17. A method for registration of two images, comprising the steps of:

extracting from each of said images at least first and second image points for measurement of representative features of the respective image, relative to the extracted image points, for comparison with features similarly measured from the other image, relating each such first image point to each such second image point extracted from the respective image, measuring feature characteristics of the respective image with respect to each said first image point as thus related to each such second image point, which characteristics are invariant regardless of orientation and scale of the respective image, comparing the measured invariant characteristics of the two images to determine the degree of correspondence therebetween, and establishing points of correspondence between the two images in accordance with the results of said comparison.

18. The method of claim 17 wherein said features include characteristics which are variant, further comprising:

upon establishing points of correspondence between the two images in accordance with the results of comparison of the measured, invariant characteristics, measuring at least selected ones of the variant characteristics of the extracted features, and comparing the measured variant characteristics of the extracted features, thereby to effect registration of the two images in accordance with correlation of the geometric retalionship of the image points of one image with corresponding image points of the other image.

19. The method of claim 18 further comprising normalizing the measured variant characteristics of the features of one image with respect to the measured variant characteristics of the features of the other image prior to comparison of the said measured variant characteristics.

* * * * *